(12) United States Patent
Adachi et al.

(10) Patent No.: US 6,236,869 B1
(45) Date of Patent: May 22, 2001

(54) PORTABLE TERMINAL EQUIPMENT

(75) Inventors: Naofumi Adachi, Saitama; Teru Saitou, Tochigi; Akira Ootake, Tochigi; Yoshihito Takeshima, Tochigi; Ryouji Terada, Tochigi, all of (JP)

(73) Assignee: Aiwa Co., Ltd., Tokyo (JP)

( * ) Notice: Subject to any disclaimer, the term of this patent is extended or adjusted under 35 U.S.C. 154(b) by 0 days.

(21) Appl. No.: 09/155,228

(22) PCT Filed: Mar. 26, 1997

(86) PCT No.: PCT/JP97/01012

§ 371 Date: Jan. 11, 1999

§ 102(e) Date: Jan. 11, 1999

(87) PCT Pub. No.: WO97/36412

PCT Pub. Date: Oct. 2, 1997

(30) Foreign Application Priority Data

Mar. 26, 1996 (JP) ................................. 8-070484

(51) Int. Cl.$^7$ ..................................... H04Q 7/32
(52) U.S. Cl. ................... 455/572; 455/38.3; 455/90; 455/343; 455/574; 379/413
(58) Field of Search ................... 455/90, 38.3, 343, 455/572, 574, 38.2, 571; 379/413

(56) References Cited

U.S. PATENT DOCUMENTS

| | | | | |
|---|---|---|---|---|
| 4,860,005 | * | 8/1989 | DeLuca et al. | 340/825.44 |
| 5,095,308 | * | 3/1992 | Hewitt | 340/825.44 |
| 5,204,986 | * | 4/1993 | Ito et al. | 455/343 |
| 5,239,694 | * | 8/1993 | Toyoshima | 455/115 |
| 5,287,525 | * | 2/1994 | Lum et al. | 713/300 |
| 5,623,533 | * | 4/1997 | Kikuchi et al. | 455/572 |
| 5,806,006 | * | 9/1998 | Dinkins | 455/574 |
| 5,858,570 | * | 1/1999 | Akagi | 429/50 |

* cited by examiner

Primary Examiner—Lee Nguyen
Assistant Examiner—Simon Nguyen
(74) Attorney, Agent, or Firm—Smith-Hill and Bedell

(57) ABSTRACT

This invention relates to a portable terminal equipment using a battery as a power source. The equipment determines whether or not battery voltage VB is lower than a voltage value V1 in a standby state or a speaking state (ST1 and ST8). The voltage value V1 is set to such a value that the equipment is capable of generating an outgoing call and making a speech during a set period of time, when the battery voltage VB is equal to the value V1. When VB<V1, the equipment shifts to a low-consumption standby mode in which a small amount of current is consumed (ST14). When the equipment is set to a speaking state, it generates a warning by means of alerting voice and so on to warn the user that the telephone communication will be broken after a expiration of a set period of time (ST10) . Further, the equipment breaks the telephone communication (ST15) after the set period of time, for example, one minute (ST12) has elapsed since said the warning and then the equipment shifts to the low-consumption standby mode (ST14). Therefore, the user can generate another outgoing call after a break of the telephone communication and the possibility of generating the outgoing call at any necessary time increases. When a set period of time, for example, one minute has elapsed since the equipment is brought into the speaking state by the outgoing call generated from the low-consumption standby mode, the telephone communication is broken after warning to the user the break of telephone communication with the alerting voice, etc. and then the operation of telephone main body is stopped.

10 Claims, 6 Drawing Sheets

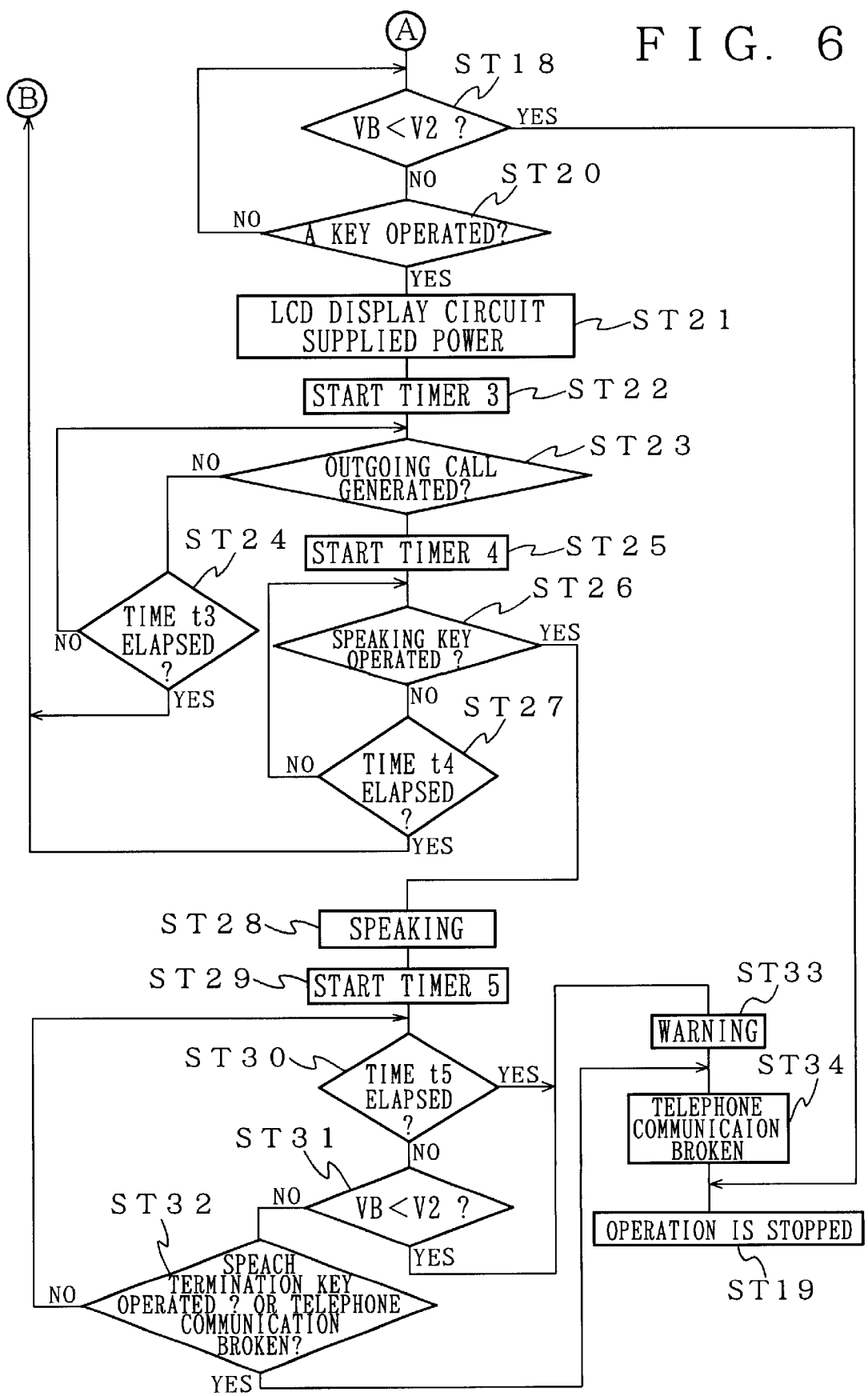

PORTABLE TERMINAL EQUIPMENT

BACKGROUND OF THE INVENTION

The present invention relates to a portable terminal equipment such as a portable telephone or the like. In details, the present invention relates to a portable terminal equipment capable of being operated with ease by shifting the equipment to a low-consumption standby mode in which a small amount of current is consumed when residual capacity of a battery is less than a predetermined value which represents the residual capacity of battery being capable of generating an outgoing call, in a standby state or a speaking state and by increasing the possibility of generating the outgoing call at necessary time.

TECHNICAL FIELD

In a simplified type portable telephone such as PHS (Personal Handyphone System), the voltage value of battery is detected in a standby state or a speaking state thereof and when said detected voltage value is less than a predetermined value, the user is warned with an alerting sound or an indication such that residual usable time of the battery is shortened and this causes the user to put the battery on charge and then the operation of the telephone main body is stopped when the voltage value of battery is less than the voltage value by which the telephone is normally operable to be used as the portable telephone.

When the user is warned with the alerting sound and so on while he or she is speaking by telephone, the requirement is briefly transmitted to the called party and then the possibility that the telephone communication may be broken, is also transmitted to the called party. However, it is impossible to generate the outgoing call to another called party after finishing the telephone communication. Usually, this causes the inconvenience for the user because the necessity to generate the outgoing call after finishing a telephone communication is elevated. Further, This also causes the inconvenience for the user because the outgoing call of the telephone may not be generated when the voltage value of battery is less than the voltage value by which the telephone is normally operable to be used as the portable telephone after warning with the alerting sound and so on in the standby state.

Hence, it is an object of the present invention to provide a portable terminal equipment capable of being operated with ease by increasing the possibility of generating an outgoing call at necessary time.

DISCLOSURE OF THE INVENTION

According to the present invention, there is provided a portable terminal equipment comprising a residual-capacity-detecting means for detecting a residual capacity of a battery, a first residual-capacity-judging means for judging whether or not the residual capacity of battery detected by said residual-capacity-detecting means is less than a first predetermined value which designates the residual capacity of battery being capable of generating the outgoing call, a second residual-capacity-judgment means for judging whether or not said residual capacity of battery detected by said residual-capacity-detecting means is less than a second predetermined value which is less than said first predetermined value, and a system control means. Said system control means controls the system so that the equipment main body system shifts to a low-consumption standby mode in which a small amount of current is consumed, when said first residual-capacity-judging means judges that said detected residual capacity of battery is less than said first predetermined value and so that the operation of equipment main body is stopped when said second residual-capacity-judgment means judges that said detected residual capacity of battery is less than said second predetermined value. The equipment comprises further a warning generating means for generating a warning and the system control means may control the system so that said warning generating means generates the warning when the equipment shifts from the speaking state to the low-consumption standby mode but said warning generating means does not generate the warning when the equipment shifts from the standby state to the low-consumption standby mode.

The residual capacity of battery is detected by the residual-capacity-detecting means. The detection of the residual capacity of battery is carried out by, for example, detecting the voltage value of battery. Alternatively, said detection is carried out by calculating the product of consumed current by the operating time of the equipment. When the residual capacity of battery is less than the first predetermined value which designates the residual capacity of battery being capable of generating the outgoing call, the equipment shifts to a low-consumption standby mode in which a small amount of current is consumed. When the residual capacity of battery is equal to the first predetermined value, it is possible, for example, to generate the outgoing call and to make a telephone communication for a set period of time.

In said low-consumption standby mode, an operation, for example, only an operation of generating the outgoing call, is accessed by said system control means. When the equipment shifts from the speaking state to the low-consumption standby mode, the warning generating means generates a warning and this warns the user that the equipment will shift to the low-consumption standby mode. When the equipment shifts from standby state to the low-consumption mode, the warning generating means does not generate the warning and thus the power consumption therefor is diminished. Further, when the residual capacity of battery is less than the second predetermined value, the operation of the equipment main body is stopped.

Additionally, the portable terminal equipment of this invention comprising a residual-capacity-detecting means for detecting a residual capacity of a battery, a first residual-capacity-judgment means for judging whether or not the residual capacity of battery detected by said residual-capacity-detecting means is less than a first predetermined value which designates the residual capacity of the battery being capable of generating the outgoing call, and a system control means. The system control means controls the system so that the terminal equipment main body shifts to the low-consumption standby state in which a small amount of current is consumed when the first residual-capacity-judgment means judges that the detected residual capacity of the battery is less than the first predetermined value. Further, the system control means controls the system so that the operation of equipment main body is stopped after a break of telephone communication when a set period of time has elapsed after generating call from the low-consumption mode and being brought into a speaking state of the equipment.

The residual capacity of battery is detected by the residual-capacity-judgment. When the residual capacity of battery is less than the first predetermined value which designates the residual capacity of battery being capable of generating the outgoing call, the equipment shifts to the low-consumption standby mode in which a small amount of current is consumed. In the low-consumption standby mode, an operation, for example, only an operation of generating the outgoing call is accessed by said system control means. When a set period of the time has elapsed since the equipment shifts from low-consumption standby mode to the speaking state following the operation of generating the outgoing call, the telephone communication is broken and then the operation of the equipment main body is stopped. Because such a constitution that the telephone communication is forcibly broken after a set period of time has elapsed, is constituted in this invention, the warning to the user by the warning generating means, for example, before the break of the telephone communication carries out in the state that the battery still has enough residual capacity to some degree.

BRIEF DESCRIPTION OF DRAWINGS

FIG. 6 is a flowchart (2/2) showing an operational control of the microcomputer in the standby state or the speaking state.

BEST MODE FOR CARRYING OUT THE INVENTION

Figure 1:
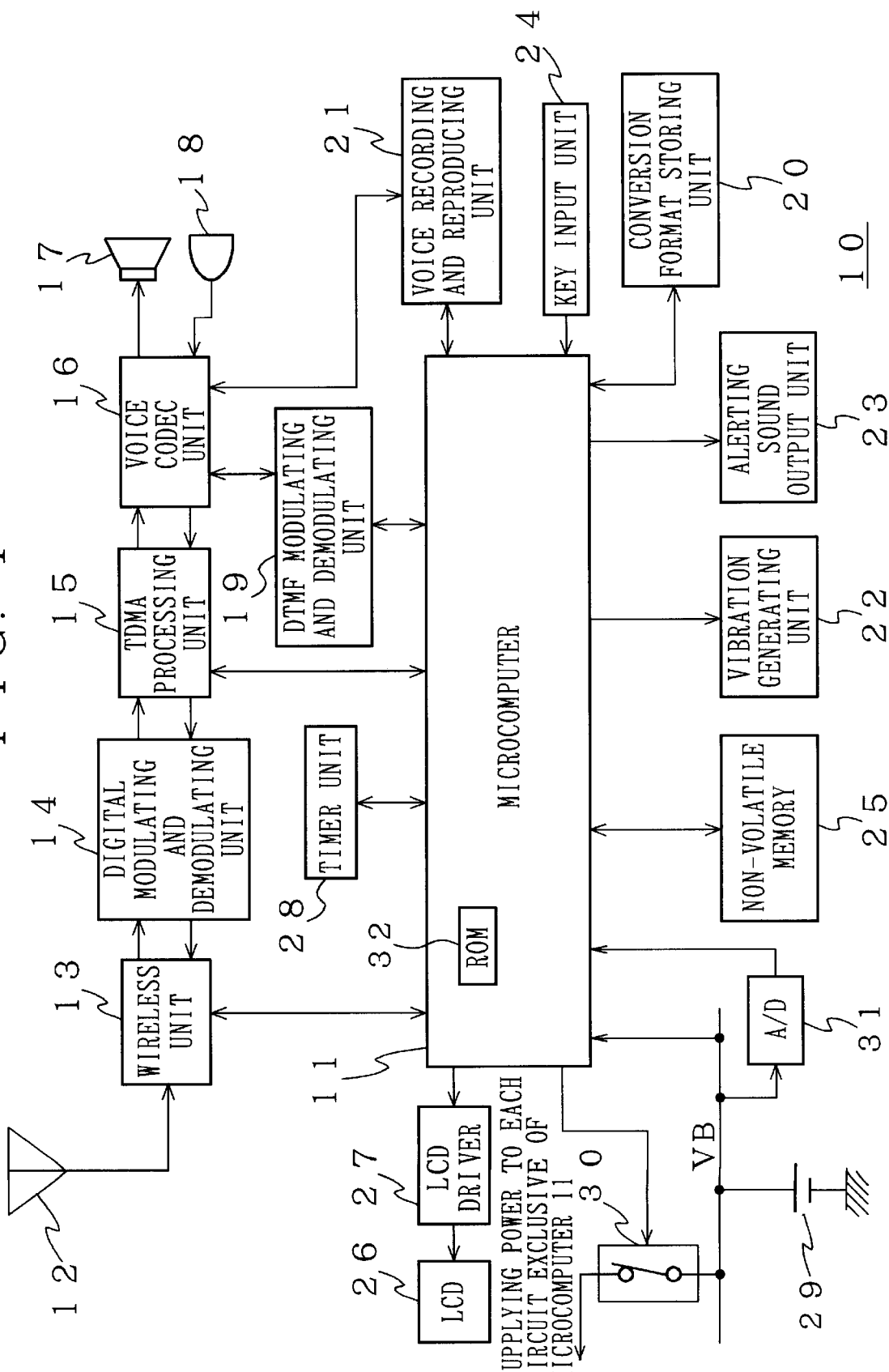
FIG. 1 is a block diagram showing the constitution of a simplified type portable telephone as a best mode of this invention.

FIG. 1 shows a simplified type portable telephone 10 according to an embodiment as the best mode of this invention.

The telephone 10 is provided with a microcomputer 11 for controlling a system, an antenna 12 for the transmission and reception of signal, a wireless unit 13 downconverting a receiving signal at a predetermined frequency caught by the antenna 12 to provide a π/4 shift QPSK (Quadrature Phase Shift Keying) signal and upconverting a π/4 shift QPSK signal outputted from a digital modulating and demodulating unit 14, mentioned later, to provide a transmitting signal at a predetermined frequency, and the digital modulating and demodulating unit 14 demodulating the π/4 shift QPSK signal outputted from the wireless unit 13 to provide the receiving data and modulating the transmitting data outputted from a TDMA (Time Division Multiple Access) processing unit, mentioned later, to provide the π/4 shift QPSK signal.

The telephone 10 is also provided with the TDMA processing unit 15 for selecting the data of down slots, which are previously set, from a receiving data (time division multiplex data in a plurality of slots) outputted from the digital modulating and demodulating unit 14, for separating the data into control data and compressed voice data and for multiplexing the compressed voice data outputted from a voice codec unit, mentioned later, and the control data outputted from the microcomputer 11 to the up slots which are previously set.

Further, the telephone 10 is provided with the voice codec unit 16 for carrying out decoding processing (including error correcting processing) in respect of the compressed voice data outputted from the TDMA processing unit 15 to provide a receiving voice signal and for carrying out compressed code forming processing (including an additional processing of the error correcting processing) in respect of a transmitting voice signal to provide the compressed voice data, a speaker (receiver) 17 for being supplied with the receiving voice signal outputted from the voice codec unit 16 and a microphone (transmitter) 18 for supplying a transmitting voice signal to the voice codec unit 16.

Additionally, the telephone 10 is provided with a DTMF modulating and demodulating unit 19 for converting a DTMF (Dual Tone Multiple Frequency) signal provided at the voice codec unit 16 as a receiving voice signal into key data in correspondence with special input keys such as "*" and "#" or ten keys of "0" through "9" to supply the data to the microcomputer 11 and for converting the key data in correspondence with special input keys such as "*" and "#" or ten keys of "0" through "9" outputted from the microcomputer 11 into the DTMF signal to supply it to the voice codec unit 16 as a transmitting voice signal, and a conversion format storing unit 20 for converting the key data outputted from the DTMF modulating and demodulating unit 19 into character data. The conversion format storing unit 20 is connected to the microcomputer 11.

Still further, the telephone 10 is provided with a voice recording and reproducing unit 21 for recording a receiving voice signal provided by the voice codec unit 16 and for reproducing a recorded receiving voice signal or a previously recorded answer message (voice signal) by operation of a key input unit, mentioned later, or control of the microcomputer 11 in an absence recording mode, a vibration generating unit 22 for vibrating a telephone main body by control of the microcomputer 11 when a signal is received in the case where a vibration mode is set, and an alerting sound output unit 23 for outputting alerting sound by control of the microcomputer 11 when a signal is received in the case where the vibration mode is not set. In this case, the voice recording and reproducing unit 21 is provided with, for example, a semiconductor memory as a storage medium for a voice signal. Operation of the voice recording and reproducing unit 21 is controlled by the microcomputer 11 and a signal indicating the operational state of the voice recording and reproducing unit 21 is supplied from the unit 21 to the microcomputer 11.

Further, the telephone 10 is provided with the key input unit 24 arranged with a speaking key for instructing an outgoing call or for responding when called, a termination key for terminating speech, a function key for shifting to a telephone book registering mode and for setting an absence recording mode or a vibration mode and so on, ten keys and special input keys for inputting a telephone number or the like and a recording key, a reproducing key and soon each of which is provided for operating the recording and reproducing of the voice recording and reproducing unit 21. The key input unit 24 is connected to the microcomputer 11 and key operation of the key input unit 24 is monitored by the microcomputer 11.

Further, the telephone 10 is provided with a non-volatile memory 25 for storing telephone book data, redial data, character message data transmitted from the called party, mode setting information and so on, a timer unit 28 for counting a time period from an arbitrary time point by control of the microcomputer 11 and a liquid crystal display (LCD: Liquid Crystal Display) 26 for displaying a state of a system, the telephone number of the called party in calling and character message transmitted from the called party and so on. The liquid crystal display 26 is driven by an LCD driver 27 controlled by the microcomputer 11.

Further, the telephone 10 is provided with a connection switch 30 for supplying a power from the battery 29 to each circuits of the telephone exclusive of the microcomputer 11, and A/D (analog-to-digital) converter 31 for converting the voltage VB of battery 29 into a digital signal to supply it to the microcomputer 11. The microcomputer 11 manages to keep various controls of the telephone, as mentioned later, in such way as to detect the voltage of battery 29 from the output data of the A/D converter 31, to compare said detected voltage with the voltage values V1, V2 (V1>V2) which are stored in the ROM (Read Only Memory) built in the microcomputer 11 and to shift the telephone into the low-consumption mode thereof.

Figure 4:
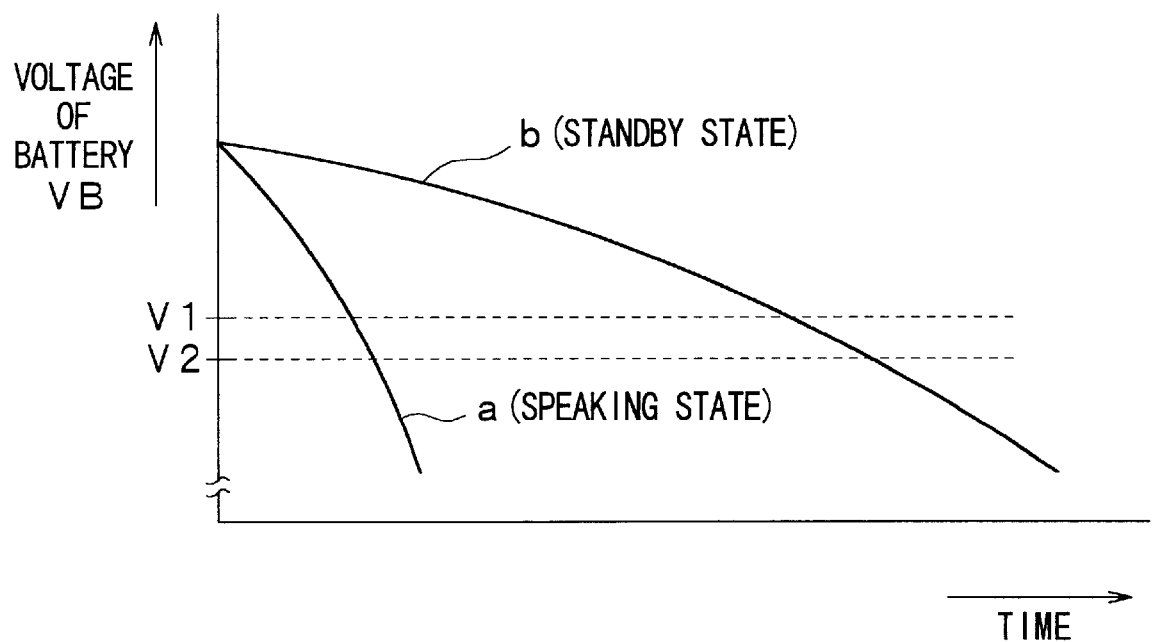
FIG. 4 is a diagram showing the relationship between the voltage VB of battery and each of the voltage values, V1, V2.

The voltage value V1 is set to such a value that the telephone is capable of generating an outgoing call and to make a telephone communication for a set period of time, for example, more than two minutes, when the voltage VB of battery is equal to the voltage value V1. The voltage value V2 is set to such a value that the telephone is normally operable to be used as the portable telephone when voltage VB of battery is more than the voltage value V2. FIG. 4 shows the relationship between the voltage VB of a power source and each of the voltage values V1, V2. Curve a shows the relationship between the time and the voltage VB of battery in the speaking state of the telephone, and curve b shows the relationship between the time and the voltage VB of battery in the standby state of the telephone. The electric power is supplied directly from the battery 29 to the microcomputer 11.

Figure 2:
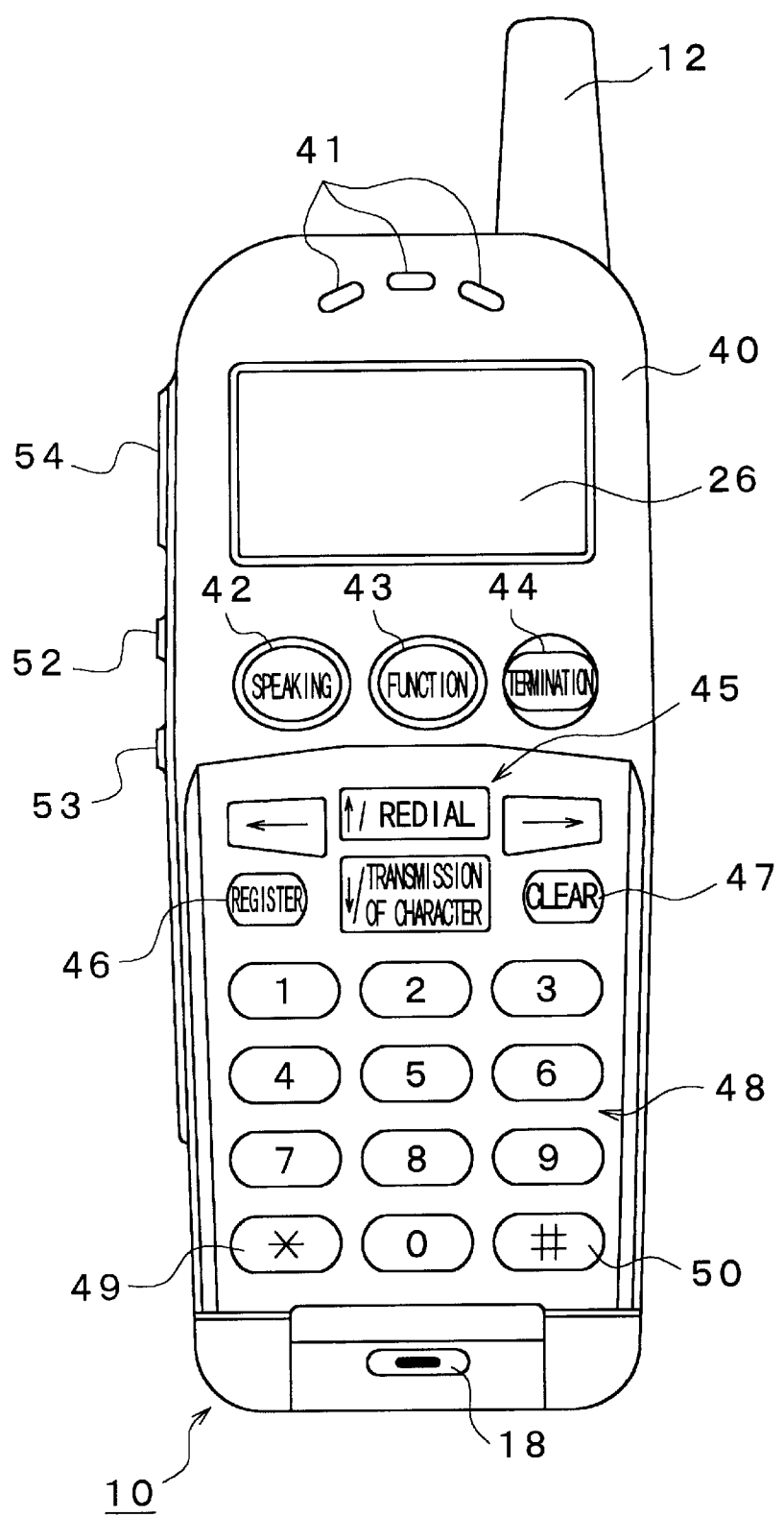
FIG. 2 is a front view showing the simplified type portable telephone (where a key-protecting lid is detached).
Figure 3:
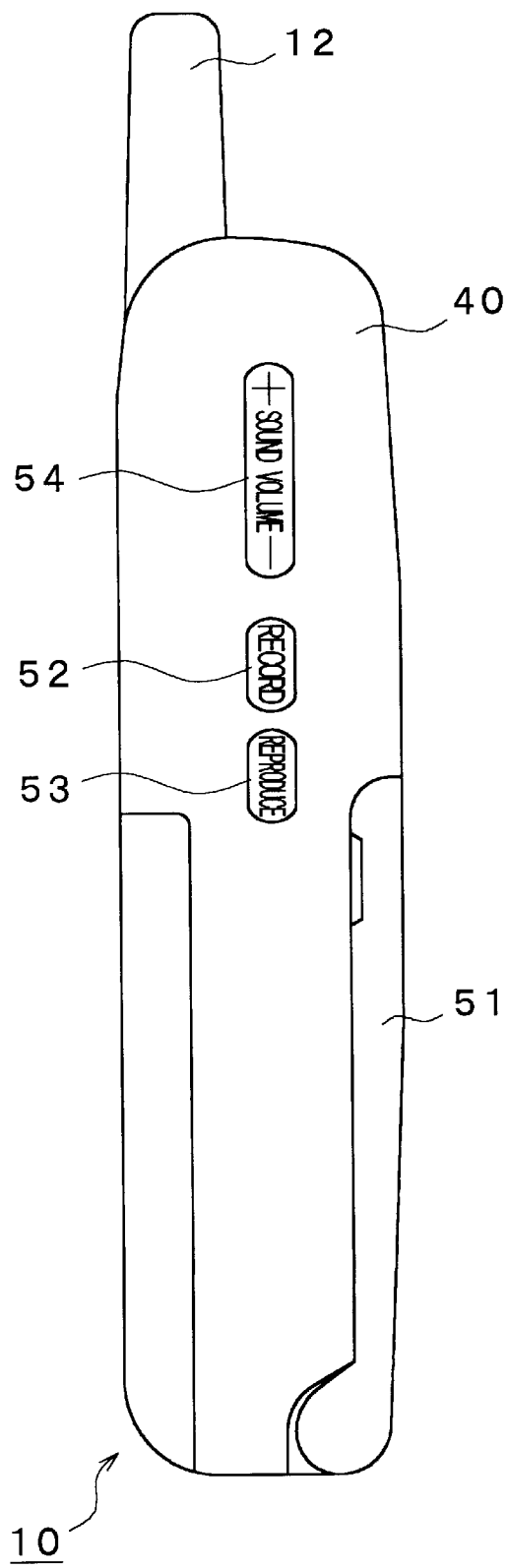
FIG. 3 is a side view showing the simplified type portable telephone.

FIG. 2 and FIG. 3 show the outlook of the telephone 10 and the same notations attaching thereto show portions in correspondence with those in FIG. 1.

The antenna 12 is arranged at the upper end portion of a telephone main body 40. Further, voice passing holes 41 for leading out voice from a built-in speaker to outside is formed at an upper portion of the main body 40 and the liquid crystal display 26 is arranged thereunder. Further, the microphone 18 is arranged at a lower portion of the main body 40. Further, a speaking key 42, a function key 43 and a termination key 44 are arranged to align laterally at a central portion of the main body 40 and on the lower side of the liquid crystal display 26. The termination key 44 constitutes a power ON/OFF key when it is pushed for a long period of time.

Additionally, cursor moving keys 45 for moving the cursor up and down to right and left, a registration key 46 for registering a telephone book, a clear key 47 for clearing input data, ten keys 48 and special input keys 49 and 50 are arranged on the lower side of the keys 42 through 44. In this case, "↑" key constituting the cursor moving key 45 serves also as a key for initiating the search of redial data or telephone book data and "↓" key serves also as a key for shifting to a character transmitting mode during a telephone communication and for confirming received character data.

Further, the main body 40 is arranged with a key-protecting lid 51 which is constituted openably and closably with a portion of arranging the microphone 18 as a fulcrum. By closing the key-protecting lid 51, the keys 45 through 50 are covered. Therefore, it is necessary to operate the keys 45 through 50 in a state where the key-protecting lid 51 is opened. Incidentally, FIG. 2 shows a telephone in a state where the key protecting lid 51 is removed.

Further, a recording key 52 and a reproducing key 53 each of which is provided for operating recording and reproducing of the voice recording and reproducing unit 21 (see FIG. 1) and a sound volume adjusting key 54 for adjusting sound volume, are arranged at a side face of the main body 40. The sound volume adjusting key 54 is constituted such that when + side thereof is operated to push, the sound volume is increased and conversely, when − side is operated to push, the sound volume is reduced.

Next, an explanation will be given of the operation of the telephone 10 shown by FIG. 1.

When the power source is made ON, the telephone is brought to a state where the synchronism with a control channel is made off and accordingly, establishment of synchronism with the control channel is carried out after receiving the control channel transmitted from a cell station. Further, thereafter, location registration indicating that the telephone stays within the service area of the service station is carried out. The location registration is carried out by using a speaking channel. After finishing the location registration, the telephone returns to its control channel receiving state and is brought into a standby state.

When the telephone number of called party is inputted by key operation at the key input unit 24 (ten keys 48 or the like), or the speaking key 42 is operated after searching redial data or telephone book data, telephone number data or the like are firstly supplied to the TDMA processing unit 15 as control data by the microcomputer 11 and are transmitted to the cell station via the control channel. Thereby, the telephone communication is made to the called party and a speaking state is brought about.

In this case, although telephone communication is carried out by using the speaking channel, in processing the telephone communication, the communication frequency data of the speaking channel and the data relating to the slot positions each of which are transmitted as control data from the cell station by using the control channel, are supplied to the microcomputer 11 via the TDMA processing unit 15. The microcomputer 11 makes the transmission and reception frequency coincide with the communication frequency of the speaking channel by controlling the wireless unit 13 based on the communication frequency data and sets slots selected by the TDMA processing unit 15 on the basis of the slot position data. Accordingly, telephone communication is carried out by using the speaking channel informed from the cell station.

Further, in the case that call data is supplied to the microcomputer 11 via the TDMA processing unit 15 and reception of signal is detected when the call data is transmitted as control data from the cell station by using the control channel, the alerting sound output unit 23 is controlled by the microcomputer 11 and thus the alerting sound is outputted thereby. Alternatively, the telephone main body 40 is vibrated by controlling the vibration generating unit 22 by the microcomputer 11.

When the speaking key 42 is operated and a response is produced in a state that the call operation is being carried out, response data is supplied as control data from the microcomputer 11 to the TDMA processing unit 15 and is transmitted to the cell station via the control channel. Thereby, the connection with the called party is carried out and the speaking state is brought about. Also in this case, telephone communication is carried out by using the speaking channel informed from the cell station.

In the speaking state, compressed voice data transmitted via the speaking channel is outputted from the TDMA processing unit 15. The compressed voice data is supplied to the voice codec unit 16, subjected to a decoding processing and thereafter converted into an analog signal. Further, the received voice signal outputted from the voice codec unit 16 is supplied to the speaker 17 and voice is outputted from the speaker 17.

Further, a transmitting voice signal outputted from the microphone 18 is supplied to the voice codec unit 16, converted into a digital signal and thereafter subjected to compressed code forming processing whereby compressed voice data is formed. Further, the compressed voice data outputted from the voice codec unit 16 is supplied to the TDMA processing unit 15 and is transmitted to the called party via the speaking channel.

In this case, by operating "↓" key of the cursor moving key 45, transmission of character data can be carried out by using the ten keys 48 or the special input keys 49 and 50. In this case, DTMF signals in correspondence with the operated keys are outputted from the DTMF modulating and demodulating unit 19 and is supplied to the voice codec unit 16 as a transmitting voice signal.

Further, when the telephone is set to an absence recording mode in the case where the call data are supplied from the TDMA processing unit 15 to the microcomputer 11 and the reception of signal is detected as mentioned above, a response is made automatically after outputting alerting sound for a predetermined period of time, and the speaking state is brought about. Further, after transmitting to the calling side the response message that a received voice signal will be recorded, recording of the received voice signal is started at the voice recording and reproducing unit 21.

Further, when character message data by a DTMF signal are transmitted from the called party during an absence recording or during a telephone communication, key data outputted from the DTMF modulating and demodulating unit 19 is converted into character data based on control of the microcomputer 11 in reference to the conversion format storing unit 20 and the character data is written to a character message area of the non-volatile memory 25. When the character data is written to the non-volatile memory 25 in this way, the character message of the character data is displayed on the liquid crystal display 26 and can be confirmed by operating to push "↑" key of the cursor moving key 45 for a long period of time.

Figure 5:
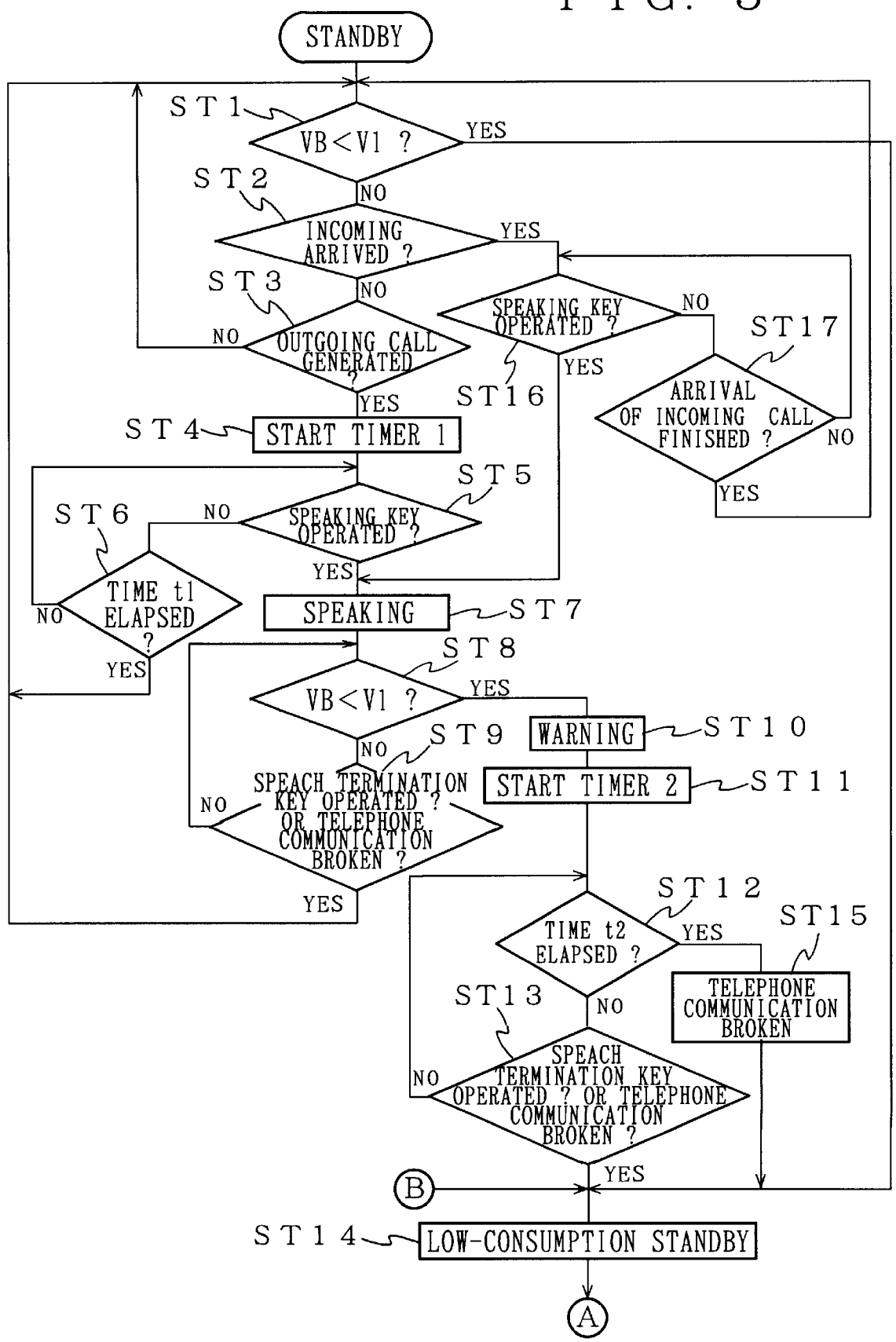
FIG. 5 is a flowchart (1/2) showing an operational control of the microcomputer in the standby state or the speaking state.

FIGS. 5 and 6 are flowcharts showing an operational control of the microcomputer in the standby state or the speaking state of the telephone.

First, at step ST1, it is determined whether the voltage value VB of battery in the standby state of the telephone is less than the voltage value V1 based on the output data of the A/D converter 31. When VB<V1 is not established, at step ST2, it is whether an incoming call has arrived. When the incoming call has not arrived, at step3, it is determined whether operation for generating an outgoing call has been carried out. The operation for generating the outgoing call means the operations such as the input operation of telephone number data by dial key (ten key 48 etc), the operation for searching the redial data and the telephone book data by keys "↑" and "↓" constituting the cursor moving keys 45.

When, at step ST3, the operation for generating the outgoing call has not been carried out, the operation returns to step ST1. When, at step ST3, the operation for generating the outgoing call has been carried out, at step ST4, a timer 1 is started. The timer 1 is constituted by the timer unit and is reset at starting operation. The same goes with the timers 2 to 5, mentioned later.

At step ST5, it is determined whether the speaking key 42 has been operated. When the speaking key 42 has not been operated, at step ST6, it is determined whether time t1, for example, 20 seconds, has elapsed. When the time t1 has not elapsed, the operation returns to the step ST5. When the speaking key 42 has been operated, at step ST7, the telephone is brought into the speaking state.

Next, at step ST8, it is determined whether the voltage value VB of battery is less than the voltage value V1 based on the output data of the A/D converter 31. When VB<V1 is not established, at step ST9, it is whether the speech termination key 44 has been operated or whether the telephone communication has been broken. When the operation of the speech termination key 44 and the break of telephone communication is not made, the operation returns to the step ST8. When the operation of the speech termination key 44 and the break of telephone communication is made, the operation returns to the step ST1.

When, at step ST8, VB<V1 is established, at step ST10, the warning that telephone communication will be broken after the expiration of the time t2, for example, one minute, is generated. In this case, warning message data which are previously stored in the recording media are read out by the voice recording and reproducing unit 21 and alerting voice is outputted from the speaker 17. Alerting sound may be outputted, for example, by using also the alerting sound output unit 23.

Next, at step ST11, the timer 2 is started. Then, at step ST12, it is determined whether time t2 has elapsed. When the time t2 has not elapsed, at step ST13, it is whether the speech termination key 44 has been operated or whether the telephone communication has been broken. When the operation of the speech termination key 44 and the break of telephone communication is not made, the operation returns to the step ST12. When the operation of the speech termination key 44 and the break of telephone communication is made, the operation goes to the step ST14. When, at step ST12, the time t2 has elapsed, at step 15, telephone communication is broken and the operation goes to the step ST14.

When, at step ST2, the incoming call has arrived, at step ST16, it is determined whether the speaking key 42 has been operated. When the speaking key 42 has not been operated, at step ST17, it is determined whether the arrival of incoming call has finished. When the arrival of incoming call has not finished, the operation returns to the step ST16. When the arrival of incoming call has finished, the operation returns to the step ST1. When, at step ST16, the speaking key 42 has been operated, the operation goes to the step ST7 and the telephone is brought into the speaking state.

Further, at step ST14, the telephone shifts to the low-consumption standby mode. In other words, the microcomputer 11 control the connection switch 30 opened. Thus, the electric power is not supplied to every circuit exclusive of the microcomputer 11. Only a key operation of the key input unit 24 is accessed by the microcomputer 11.

Next, at step ST18, it is determined whether the voltage value VB of battery is less than the voltage value V2 based on the output data of the A/D converter 31. When VB<V2 is established, at step ST19, the operation (function) of telephone main body is stopped.

When VB<V2 is not established, at step ST20, it is whether a key has been operated. When any key has not been operated, the operation returns to the step ST18.

When a key has been operated, at step ST21, the connection switch 30 is brought into ON state and the telephone main body starts its operation. In this case, liquid crystal display 26 is brought into a display state and thus display the message, such as "one more call" which means that the generation of outgoing call is limited to only one occasion.

Next, step ST22, the timer 3 is started and, at step ST23, it is determined whether the operation for generating the outgoing call has carried out. When the operation for generating the outgoing call has not carried out, at step ST24, it is determined whether time t3, for example, 20 seconds, has elapsed. When the time t3 has not elapsed, the operation returns to the step ST23. When the time t3 has elapsed, the operation returns to the step ST14 and thus the telephone shifts again to the low-consumption mode.

When, at step ST23, the operation for generating the outgoing call has carried out, at step ST25, timer 4 is started and then, at step ST26, it is determined whether the speaking key 42 has been operated. When the speaking key 42 has not been operated, at step ST27, it is determined whether time t4, for example, 20 seconds, has elapsed. When the time t4 has not elapsed, the operation returns to the step ST26. When the time t4 has not elapsed, the operation returns to the step ST26. When the time t4 has elapsed, the operation returns to the step ST14 and thus the telephone shifts again to the low-consumption mode.

When, at step ST26, the speaking key 42 has been operated, at step ST28, the telephone is brought into the speaking state. At step ST29, timer 5 is stated and, at step ST30, it is determined whether time t5, for example, one minute, has elapsed. When the time t5 has not elapsed, at step ST31, it is determined whether the voltage value VB of battery is less than the voltage value V2 based on the output data of the A/D converter 31. When VB<V2 is not established, at step ST32, it is whether the speech termination key 44 has been operated or whether the telephone communication has been broken. When the operation of the speech termination key 44 and the break of telephone communication is not made, the operation returns to the step ST30.

When, at step ST30, the time t5 has elapsed, the warning that telephone communication is broken promptly, is generated. In this case, warning message data which are previously stored in the recording media are read out by the voice recording and reproducing unit 21 and alerting voice is outputted from the speaker 17. Alerting sound may be outputted, for example, by using also the alerting sound output unit 23. As such an alerting sound, alerting sound other than the one used in the step ST10 may be used. At step ST34, the telephone communication is broken and then, at step 19, the operation (function) of telephone main body is stopped.

When, at step ST31, VB<V2 is established, the operation goes to the step ST33 in which the same operations as the case that the time t5 has elapsed as described above, are carried out. Further, when, at step ST32, the operation of the speech termination key 44 and the break of telephone communication is made, the operation goes to the step ST34 and the telephone communication is promptly broken and then, at step 19, the operation (function) of telephone main body is stopped.

In this embodiment, when the voltage VB of battery is less than the voltage value V1 in the standby stage or the speaking state, the telephone shifts to the low-consumption mode in which a small amount of current is consumed. In this case, the telephone shifts to the low-consumption mode after breaking the telephone communication in the case of the speaking mode. Therefore, the telephone having the residual capacity of battery such that it is possible to speak for a set period of time t5, for example, one minute after generating again the outgoing call, may shift to the low-consumption mode. Thus, it is possible to generate again the outgoing call after breaking the telephone communication, as described before and the telephone is capable of being operated with ease.

Further, when the voltage VB of battery is less than the voltage value V1 in the speaking state, the telephone is brought into the state of breaking the telephone communication after the time t2, for example, one minute has elapsed since warning the user by the alerting voice and/or sound. Therefore, this invention prevents telephone from such an inconvenience that the telephone communication is suddenly broken and thus the conversation is finished abnormally. When the voltage VB of battery is less than the voltage value V1 in the state of breaking telephone communication, the equipment shifts directly to the low-consumption standby mode without warning the user by the alerting voice and/or sound and thus, the electric power necessary for the warning is saved.

Further, when the time t5, for example, one minute has elapsed after generating again the outgoing call or the voltage value VB of battery is less than the voltage value V2, the telephone is brought into the state of breaking the telephone communication after warning the user by the alerting voice and/or sound and then the operation (function) of the telephone main body is stopped. Therefore, the user may acknowledge the stop of the operation (function) of the telephone main body caused by the minimum residual capacity of the battery, which is capable of operating normally the telephone as the portable telephone. The telephone communication is forcibly broken after the time t5 has elapsed and thus the warning to the user by the warning generating means, for example, may carry out before the break of the telephone communication in the state that the battery still has enough residual capacity to some degree.

Although, in the embodiment above, the detection of the residual capacity of battery is carried out by detecting the voltage value of battery, said detection of this invention may be carried out by calculating the product of the consumed current by the operating time of the telephone.

Further, although according to the above-described embodiments, the present invention is applied to a simplified type portable telephone, it is without a doubt that the present invention is applicable similarly to other portable terminal equipment.

Industrial Applicability

As described above, a portable terminal equipment according to the present invention is preferably applied to a portable terminal equipment of a simplified type portable telephone or the like using the battery as the power source.

What is claimed is:

1. A portable terminal equipment comprising:
  a residual-capacity-detecting means for detecting a residual capacity of a battery;
  a first residual-capacity-judging means for judging whether or not the residual capacity of battery detected by said residual-capacity-detecting means is less than a first predetermined value, said first predetermined value designating the residual capacity of the battery being capable of generating at least one outgoing call;
  a second residual-capacity-judging means for judging whether or not said residual capacity of battery detected by said residual-capacity-detecting means is less than a second predetermined value, said second predetermined value being less than said first predetermined value;

warning-generating means for generating a warning; and
system control means;
    wherein said system control means controls the system so that the equipment main body shifts to a low-consumption standby mode in which a small amount of current is consumed, when said first residual-capacity-judging means judges that said detected residual capacity of battery is less than said first predetermined value;
    wherein said system control means controls the system so that said warning-generating means generates the warning when the equipment main body shifts from a speaking state to said low-consumption standby mode but said warning-generating means does not generate the warning when the equipment main body shifts from a standby state to said low-consumption standby mode; and wherein said system control means controls the system so that the operation of said equipment main body is stopped when said second residual-capacity-judging means judges that said detected residual capacity of battery is less than said second predetermined value.

2. A portable terminal equipment according to claim 1, wherein only an operation for generating the outgoing call is accessed by said system control means in said low-consumption standby mode.

3. A portable terminal equipment according to claim 1, wherein said system control means controls the system so that the equipment main body shifts to the low-consumption standby mode after breaking the telephone communication when said first residual-capacity-judging means judges that said detected residual capacity of battery is less than said first predetermined value, in a speaking state of the equipment.

4. A portable terminal equipment according to claim 3, wherein said system control means controls said warning-generating means so that the warning-generating means generates the warning at a set period of time before the telephone communication is broken.

5. A portable terminal equipment according to claim 1, wherein said system control means controls the system so that the operation of the equipment main body is stopped after breaking the telephone communication when said second residual-capacity-judging means judges that said detected residual capacity of battery is less than said second predetermined value, in a speaking state of the equipment.

6. A portable terminal equipment according to claim 5, wherein said system control means controls said warning-generating means so that the warning-generating means generates the warning before the telephone communication is broken.

7. A portable terminal equipment comprising:
a residual-capacity-detecting means for detecting a residual capacity of a battery;
a first residual-capacity-judging means for judging whether or not the residual capacity of battery detected by said residual-capacity-detecting means is less than a first predetermined value, the value designating the residual capacity of the battery being capable of generating at least one outgoing call; and
a system control means;
    wherein said system control means controls the system so that the equipment main body shifts to a low-consumption standby mode in which a small amount of current is consumed, when said first residual-capacity-judging means judges that said detected residual capacity of battery is less than said first predetermined value; and
    wherein said system control means controls the system so that the operation of the equipment main body is stopped after a break of telephone communication when a set period of time has elapsed after generating an outgoing call from said low-consumption standby mode and being brought into said speaking state.

8. A portable terminal equipment according to claim 7 comprising:
a second residual-capacity-judging means for judging whether or not said residual capacity of battery detected by said residual-capacity-detecting means is less than a second predetermined value, said value being less than said first predetermined value;
wherein said system control means controls the system so that the operation of the equipment main body is stopped when said second residual-capacity-judging means judges that said detected residual capacity of battery is less than said second predetermined value.

9. A portable terminal equipment according to claim 7, wherein said system control means controls the system so that the warning-generating means generates the warning before the telephone communication is broken.

10. A portable terminal equipment comprising:
a residual-capacity-detecting means for detecting a residual capacity of a battery;
a first residual-capacity-judging means for judging whether or not the residual capacity of battery detected by said residual-capacity-detecting means is less than a first predetermined value, said first predetermined value designating the residual capacity of battery being capable of generating at least outgoing call;
a second residual-capacity-judging means for judging whether or not said residual capacity of battery detected by said residual-capacity-detecting means is less than a second predetermined value, said second predetermined value being less than said first predetermined value; and
a system control means;
    wherein said system control means controls the system so that the equipment main body shifts to a low-consumption standby mode in which a small amount of current is consumed, when said first residual-capacity-judging means judges that said detected residual capacity of battery is less than said first predetermined value; and
    wherein said system control means controls the system so that the operation of the equipment main body is stopped when said second residual-capacity-judging means judges that said detected residual capacity of battery is less than said second predetermined value.

* * * * *